No. 786,218.　　　　　　　　　　　　　PATENTED MAR. 28, 1905.
C. JOHNSON & O. C. RAWLEY.
FERTILIZER DISTRIBUTER.
APPLICATION FILED SEPT. 5, 1903.

3 SHEETS—SHEET 1.

Witnesses　　　　　　　　　　　　　Inventors
　　　　　　　　　　　　　　　　　　C. Johnson.
　　　　　　　　　　　　　　　　　　O. C. Rawley.
　　　　　　　　　　　By
　　　　　　　　　　　　　　　　　　　Attorneys No. 786,218. PATENTED MAR. 28, 1905.
C. JOHNSON & O. C. RAWLEY.
FERTILIZER DISTRIBUTER.
APPLICATION FILED SEPT. 5, 1903.
3 SHEETS—SHEET 2.
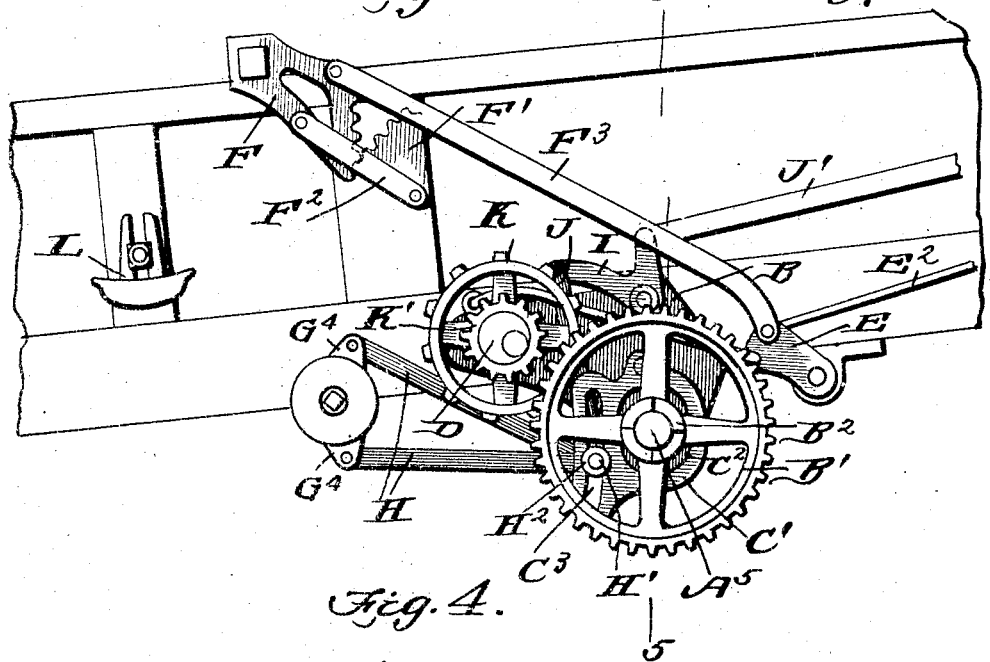
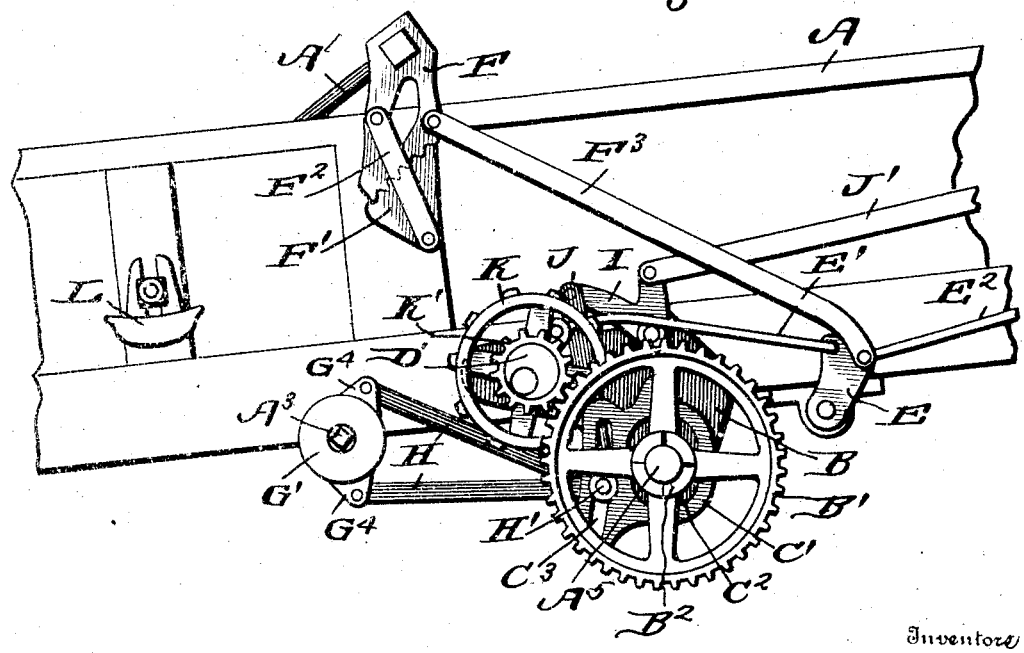
Witnesses
M. S. Blondell
Clarence Shaw
Inventors
C. Johnson,
O. C. Rawley.
By O'Meara & Brock,
Attorneys

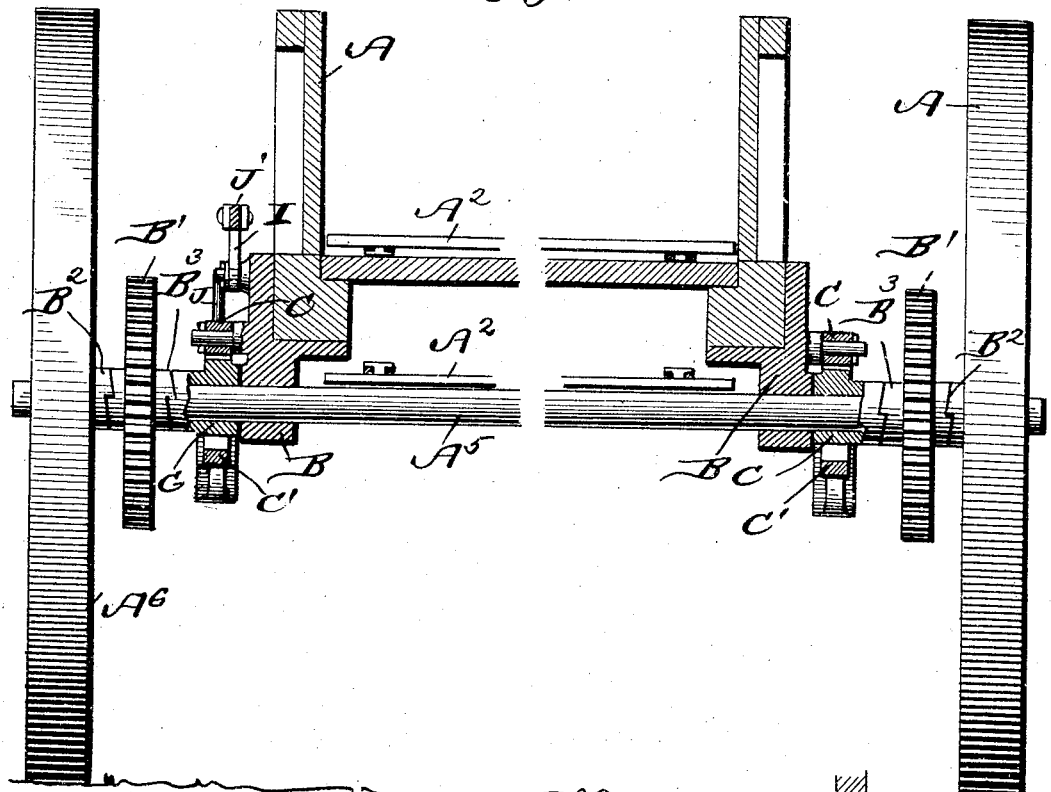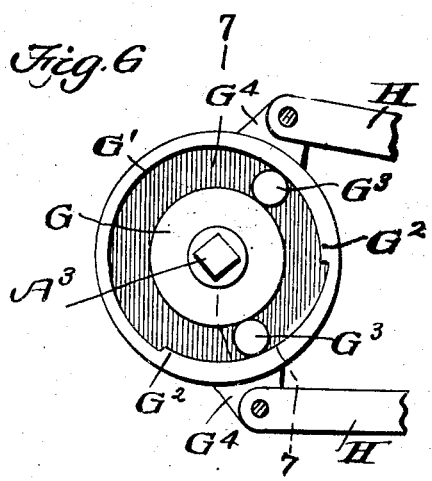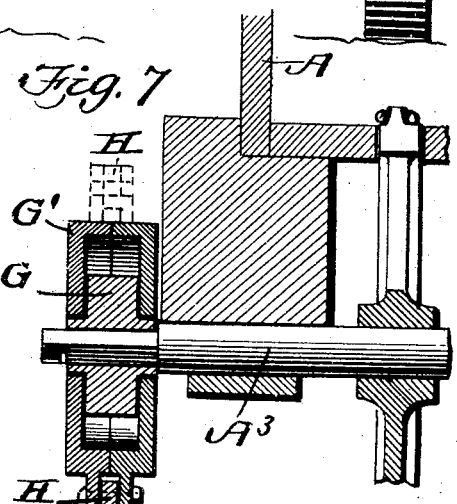

No. 786,218.                                                                 Patented March 28, 1905.

UNITED STATES PATENT OFFICE.

CHARLES JOHNSON AND OREN C. RAWLEY, OF CORTLAND, NEW YORK, ASSIGNORS TO CORTLAND IMPLEMENT COMPANY, OF CORTLAND, NEW YORK, A CORPORATION OF NEW YORK.

FERTILIZER-DISTRIBUTER.

SPECIFICATION forming part of Letters Patent No. 786,218, dated March 28, 1905.

Application filed September 5, 1903. Serial No. 172,133.

*To all whom it may concern:*

Be it known that we, CHARLES JOHNSON and OREN C. RAWLEY, citizens of the United States, residing at Cortland, in the county of Cortland and State of New York, have invented a new and useful Fertilizer-Distributer, of which the following is a specification.

Our invention is an improvement in fertilizer-distributers, and is an improvement on the distributer for which we were granted United States Letters Patent No. 704,747, dated July 15, 1902.

Our present improvement relates especially to means for regulating travel of the apron, actuation of the beaters, and for throwing the various parts into and out of gear.

The object of our invention is to provide means whereby the driver is given full control over the distribution of the fertilizer and can regulate same without leaving his seat.

Our invention consists in the novel features of construction and combination of parts hereinafter described, particularly pointed out in the claims, and shown in the accompanying drawings, in which—

Figure 1:
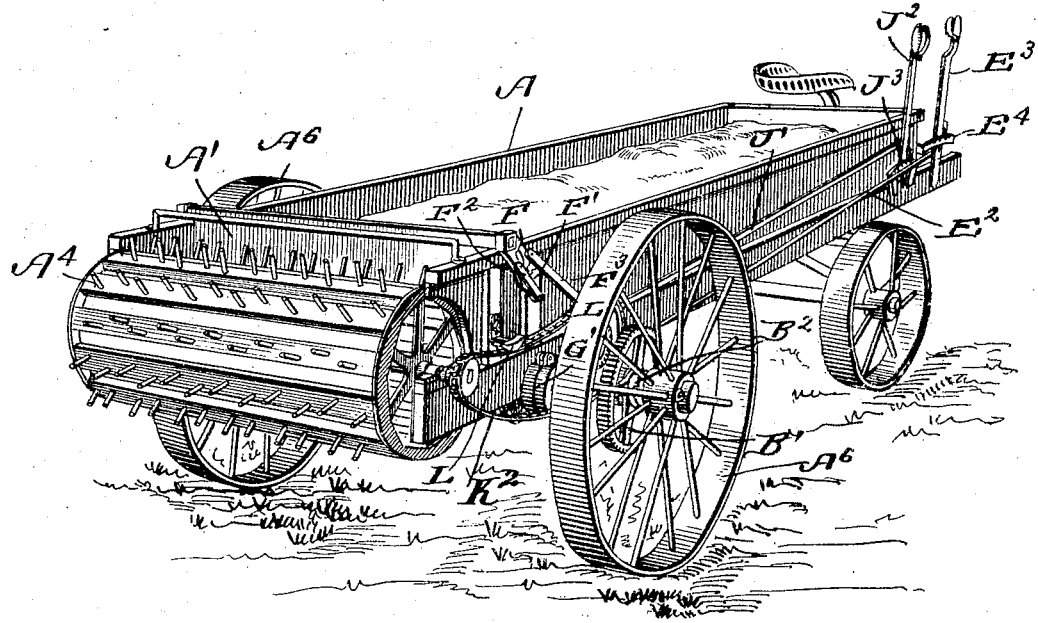
Figure 2:
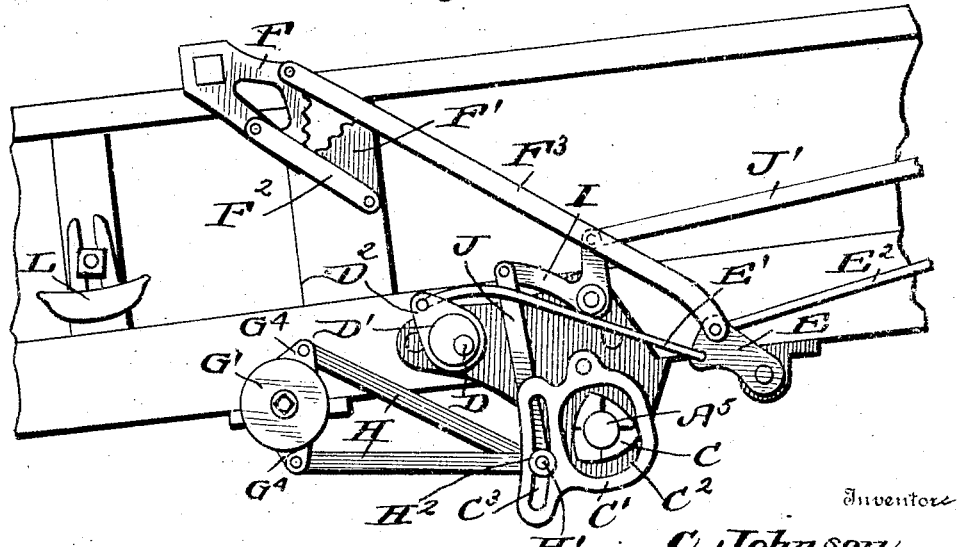

Figure 1 is a perspective view of a distributer having our improvements attached thereto. Fig. 2 is a side elevation of a portion of a wagon-body, showing our improvements, the wheels and gears being removed to more clearly show the eccentric cam-and-link mechanism. Fig. 3 is a side elevation of the parts shown in Fig. 2 and having the gearing disengaged, the end-gate being closed. Fig. 4 is a view similar to Fig. 3, but showing the position of the parts when the gate is open and the gearing in operative position. Fig. 5 is a section on the line 5 5 of Fig. 3, the axle, wagon, and gear-wheels being shown in elevation. Fig. 6 is a side elevation, one-half of the casing being removed, showing the friction-clutch rotating the apron-shaft and feeding the fertilizer. Fig. 7 is a section on the line 7 7 of Fig. 6, the shaft being shown in elevation.

In the drawings, A represents a suitable wagon-body mounted on front and rear wheels and having the movable end-gate A', movable apron $A^2$, apron-shaft $A^3$, and beaters $A^4$. On each side of this wagon-body and secured to the sills of same are rear-axle hangers B, in which is rotatably journaled the rear axle $A^5$. On this axle between the rear wheels $A^6$ and the hangers are loosely-mounted gear-wheels B', each gear-wheel being driven by a clutch mechanism $B^2$, carried by the hub of the adjacent wheel $A^6$, and a similar clutch mechanism $B^3$ is formed on the inner sides of the hubs of the gear-wheels. A three-point cam C is journaled loosely on the rear axle adjacent each hanger B and has a hub adapted to be engaged by the clutch $B^3$ of the gear-wheel B'. A cam-link C' is pivotally secured to each hanger above the axle and has an elongated cam-opening $C^2$, within which opening rotates one of the cams C, the cam having angles adapted to engage the sides of the openings $C^2$ and reciprocate the links. To the rear of the openings $C^2$ the links C' are vertically slotted, as at $C^3$, said slots being slightly curved. On the hangers, to the rear of and above the links, are arranged stub-shafts D, on each of which is mounted an eccentric D', having a pear-shaped flange $D^2$. Pivoted to a bracket in advance of each hanger is an arm E. One end of a slightly-curved rearwardly-extending rod E' is pivoted to each arm E, and the rear end of each rod is pivotally secured to apex of the pear-shaped flange of one of the eccentrics D'.

To each side of the end-gate A' is rigidly connected a bracket F, which extends over the side of the wagon-body and has a serrated edge. A bracket F' is secured to the side of the wagon-body on each side of the wagon and has a serrated edge adapted to be engaged by that of the adjacent bracket F. On each side of the wagon a bar $F^2$ is pivoted at its upper end to a bracket F and at its lower end to a bracket F'. To each bracket F is pivoted the upper end of a bar $F^3$, the lower end of the bar being pivoted to the arm E. The bars $F^2$ and $F^3$ are so arranged that when the end-gate is in a closed position and the serrated faces are at an angle to each other the bars are parallel.

On one side of the wagon a rod E² leads from the arm E to a lever E³, working over a quadrant E⁴. The outer ends of the apron-shaft A³ are squared, and on these squared portions are mounted disks G, and journaled on the hub of each disk is a cylindrical casing G', formed in half-sections. Shoulders G² are formed on the inner surface of the casing and the curve of the inner side of the casing from one shoulder to the other is eccentric with reference to the disk G. Balls G³ are placed within the casing between the shoulders and are adapted to revolve about the disk when the casing is rotated in one direction and to bind against and rotate the disk when the casing is rotated in the opposite direction.

Each section carries oppositely-extending ears G⁴, the ears of one section being parallel with those of the other, and between the two pairs of ears thus formed are pivotally secured the rear ends of bars H. The forward ends of these bars converge and are pivoted together by a bolt H', which works in the slot C³ of the link C', a head H² holding the bolt in place. A bell-crank lever I is pivoted on the upper portion of the hanger. To the rear arm of the bell-crank is pivoted the upper end of a bar J, the lower end of which is pivoted to the arms H by the bolt H'. A rod J' is pivoted to the forward arm of the bell-crank and extends forward to the front of the wagon on one side only to a lever J², working on a quadrant J³, which lever is arranged adjacent the lever E³.

Journaled on the eccentrically-mounted disks D' are sprocket-wheels K, each having a spur-gear adapted to be thrown into engagement with one of the gear-wheels B'. Running over the sprocket-wheels K are sprocket-chains K², adapted to drive the beaters A⁴.

The operation of the parts herein described is as follows: When the lever E³ is thrown forward, the rod E² will draw the arm E forward from the position shown in Fig. 3 to that shown in Fig. 4, thus drawing the bracket F downwardly and forward through the medium of the bar F³, raising the end-gate. The forward movement of the arm E draws forward the rod E', swinging the eccentric disk D' and throwing the spur-gear K' into engagement with the gear B', thus starting the beaters. The cam C rotates with the rear axle A⁵ and imparts a reciprocatory motion to the link C' and through the bars H to the casing G', through the rocking of which a step-by-step movement is given to the apron. Movement of the levers J² will, through the agency of the rod J', bell-crank lever, and bar J, slide the bolt H' in the slot C³, shifting or rocking the casing G' and regulating the feed of the apron.

An adjustable shoe L is arranged on the sides of the wagon-body over each sprocket-chain K² to hold same at the proper tension.

It will be obvious that the feed of the apron can be regulated without disturbing the position of the end-gate or the action of the beaters.

Having thus fully described our invention, what we claim as new, and desire to secure by Letters Patent, is—

1. The combination with an axle in a device of the kind described, of a cam on said axle, a link fitting over said cam, pivoted adjacent to it and reciprocated by it and having a vertical slot to one side of the cam, an apron-shaft, a ball-clutch on said shaft, bars adapted to rock said clutch and pivoted to the opposite sides of same, the free ends of the bars converging and being secured together by a pivotal bolt, said bolt sliding in the slot of the link, means for sliding said bolt, and means for rotating the cam.

2. The combination with an apparatus of the kind described, of a pivoted link having a central opening and a slot adjacent the opening, a pointed cam rotatably mounted within said opening in the link, a rotatable apron-shaft, a clutch thereon, bars pivoted at one end to the clutch and having their opposite ends pivoted together, the pivotal bolt working in the slot, means for sliding said bolt along the slot, and means for rotating the cam.

3. An apparatus of the kind described comprising a wagon-body having front and rear wheels, a clutch carried by the hub of one of the wheels, a gear-wheel mounted loosely on the axle and adapted to be rotated by said clutch, a clutch carried by the gear-wheel, a cam journaled loosely on said axle and adapted to be rotated by the clutch of the gear-wheel, a cam-link pivoted adjacent said cam and adapted to be reciprocated by same, a stub-shaft, a disk eccentrically journaled thereon, a sprocket-wheel having a spur-gear loosely journaled on the disk and means for rotating the disk on the stub-shaft and throwing the spur-gear into engagement with the gear-wheel on the axle.

4. An apparatus of the kind described comprising an axle-hanger secured to a wagon-sill, an axle journaled in the hanger, a cam-link pivoted to the hanger, a cam on the axle adapted to reciprocate the link, said link having a slot formed therein, a rotatable shaft parallel with the axle, a rocking clutch on said shaft adapted to rotate same step by step, bars pivoted at their rear ends to opposite sides of the clutch and pivoted together at their forward ends, said pivotal bolt working in the link-slot, a bell-crank pivoted to the hanger, a bar pivoted at one end to an arm of the bell-crank and at the opposite end to the bolt working in the link-slot, a lever at the forward end of the wagon, and a rod pivoted to one end of the lever and at the opposite end to the remaining arm of the bell-crank.

5. An apparatus of the kind described comprising an end-board of a wagon-body, brackets having serrated edges fixed on the outer sides of the wagon-body, brackets secured to the end-board and extending downward over the sides of the wagon and having serrated edges working on the edges of the fixed brackets, bars pivoted at one end to the fixed brackets and at the opposite end to the end-board brackets, an arm pivoted adjacent the wagon-sill, a bar pivoted at one end to one of the end-board brackets and at the opposite end to the arm, a lever adjacent the front of the wagon, and a rod pivoted at one end to the lever and at the opposite end to the arm.

6. A fertilizer-distributer comprising a wagon-body, an axle-hanger, an axle journaled thereon, a gear-wheel on said axle, a stub-shaft on the hanger, a disk eccentrically mounted on said shaft, said disk having a projecting flange, a wheel journaled on said disk, said wheel having a spur-gear, an arm pivoted adjacent the axle-hanger, a rod pivoted at one end to the flange of the disk and at the opposite end to the arm, a lever adjacent one end of the wagon, and a rod pivoted at one end to the arm and at the opposite end to the lever, said lever, arm and rods being adapted to rotate the disk and throw the spur-gear into and out of engagement with the axle-gear.

7. In a manure-spreader, the combination with the body, of a rearwardly-movable conveyer located at its bottom, a beater journaled at the rear end of the body, a shield pivotally secured at the rear end of the body, a crank adapted to turn the shield, a rear axle journaled on the rear lower portion of the body, a stub-shaft fixed on the body near said axle, an eccentric sleeve rotatably mounted on the stub-shaft and provided with an arm, a main sprocket-wheel on the sleeve and geared to the beater-shaft, a pinion mounted on said sleeve so as to turn thereon in unison with the sprocket-wheel, a main gear on the rear axle to engage said pinion, a hand-lever fulcrumed on the front of the body, and a bifurcated connection uniting the crank of the shield and the arm of the sleeve with the hand-lever, whereby the driving mechanism for the beater will be thrown out of gear when the shield is lowered and in gear when it is raised, substantially as described.

8. In a manure-spreader, the combination with the body, of a conveyer located at its bottom, a beater journaled at the rear end of the body, a shield pivotally secured at the rear end of the body, a rear axle journaled on the rear lower portion of the body, a stub-shaft fixed near said axle, an eccentric sleeve rotatably mounted on said shaft and provided with an arm, a main sprocket-wheel and a pinion rigid therewith mounted on the sleeve, a main gear on the rear axle to engage the pinion, gearing connecting the beater-shaft and main sprocket-wheel, a hand-lever fulcrumed on the body, and a bifurcated connection uniting the shield and the arm of the sleeve with the hand-lever, whereby the said pinion and the gear on the rear axle may be thrown out of gear when the shield is lowered and in gear when it is raised, substantially as described.

CHARLES JOHNSON.
OREN C. RAWLEY.

Witnesses:
G. H. GARRISON,
E. M. STANTON.